Dec. 27, 1938.   C. J. ANDERSON, JR   2,141,234
POWER TRANSMISSION
Original Filed April 2, 1934    4 Sheets-Sheet 1
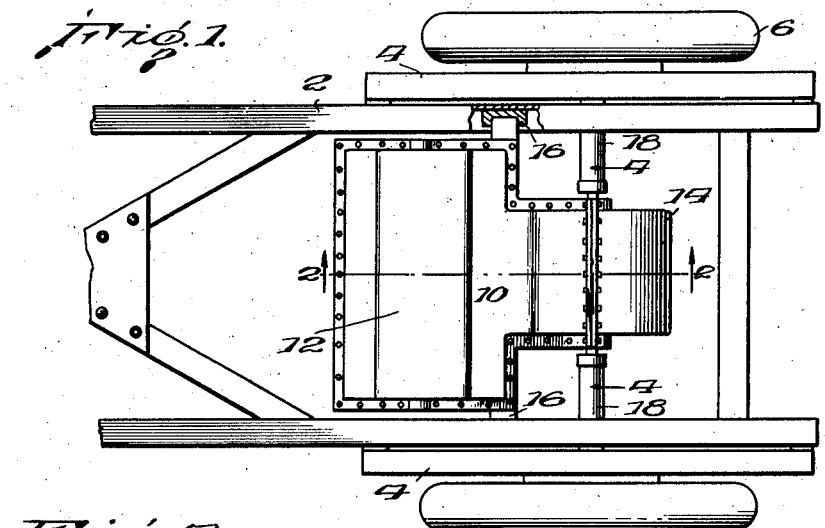
INVENTOR
Charles J. Anderson, Jr.
BY
Ralph L. Tweedale
ATTORNEY Dec. 27, 1938.   C. J. ANDERSON, JR   2,141,234
POWER TRANSMISSION
Original Filed April 2, 1934   4 Sheets-Sheet 2
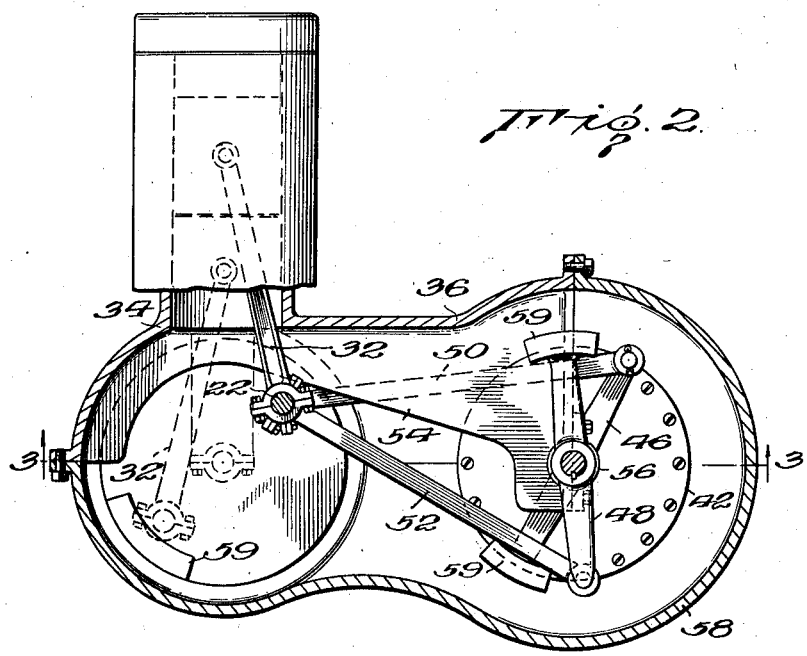
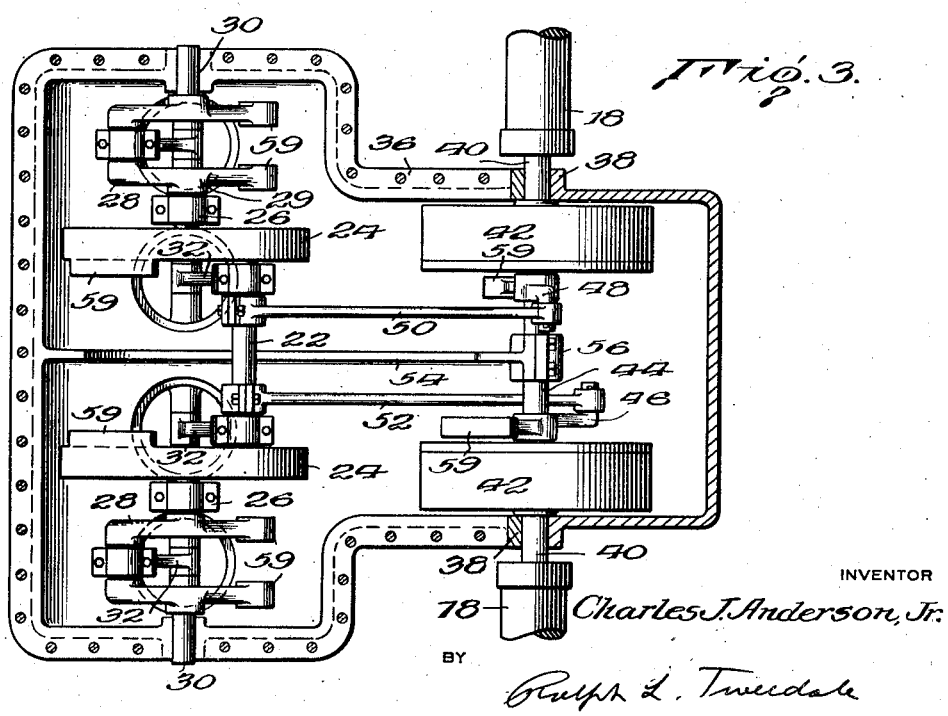
INVENTOR
*Charles J. Anderson, Jr.*
BY
*Ralph L. Tweedale*
ATTORNEY Dec. 27, 1938.   C. J. ANDERSON, JR   2,141,234
POWER TRANSMISSION
Original Filed April 2, 1934    4 Sheets-Sheet 3
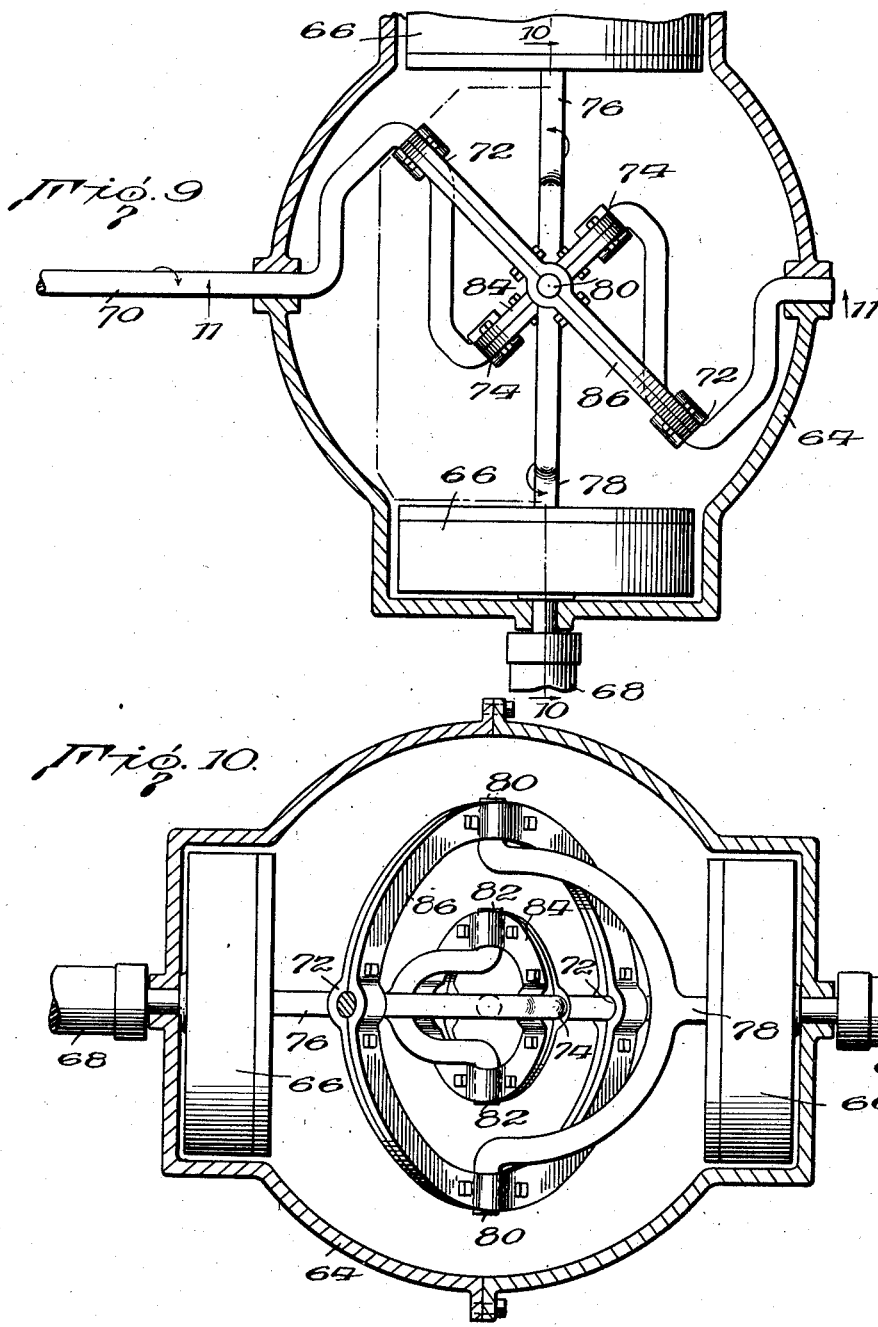
INVENTOR
Charles J. Anderson, Jr.
BY
Ralph L. Tweedale
ATTORNEY Dec. 27, 1938.   C. J. ANDERSON, JR   2,141,234
POWER TRANSMISSION
Original Filed April 2, 1934    4 Sheets-Sheet 4
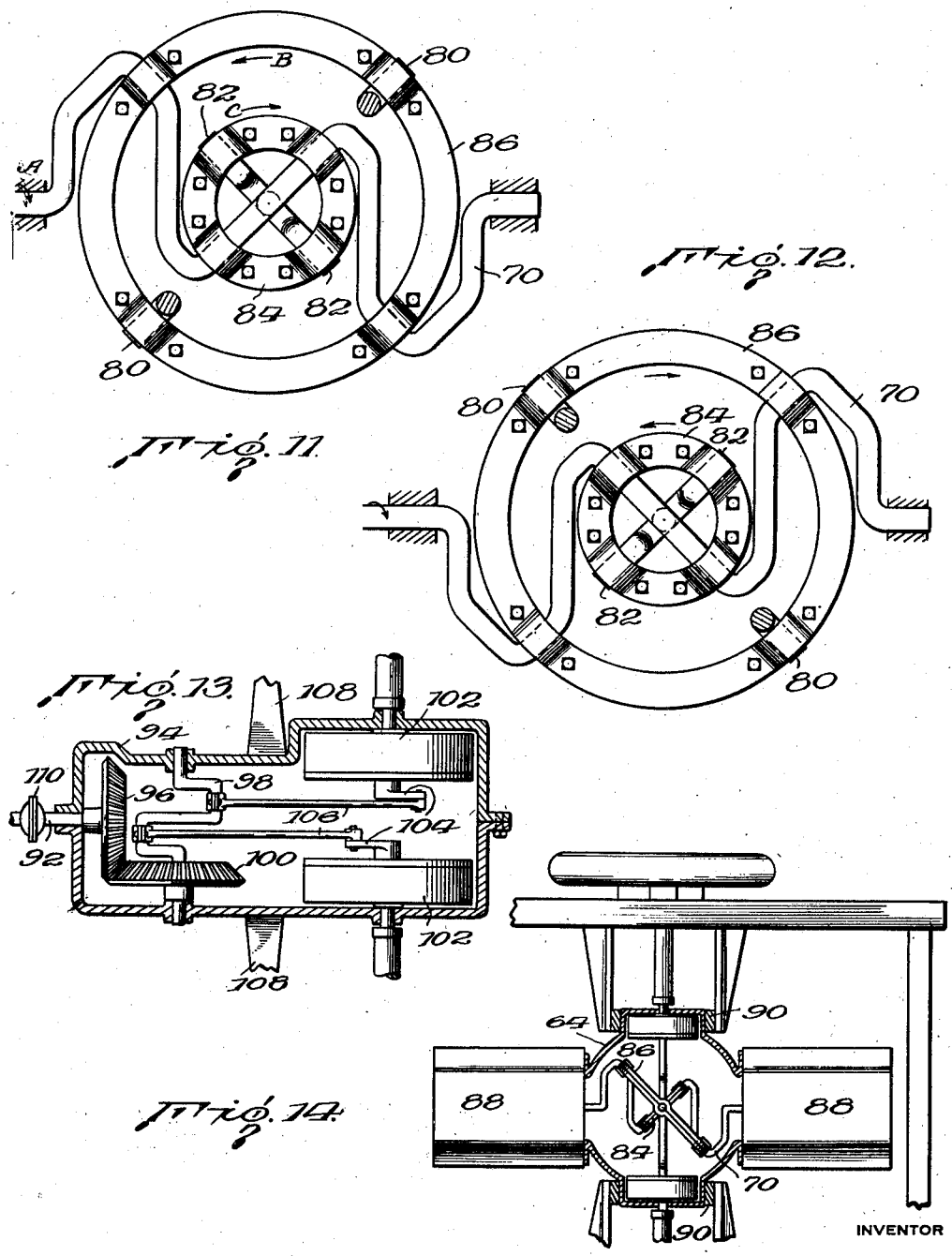
INVENTOR
Charles J. Anderson, Jr.
BY
Ralph L. Trusdale
ATTORNEY Patented Dec. 27, 1938

2,141,234

UNITED STATES PATENT OFFICE 2,141,234

POWER TRANSMISSION

Charles J. Anderson, Jr., Jamestown, N. Y.

Application April 2, 1934, Serial No. 718,723
Renewed October 7, 1937

3 Claims. (Cl. 180—64)

This invention relates to power transmissions of the type particularly adapted for use in automotive vehicles and to a novel manner of operatively connecting the power transmission to a motor, and to the manner of mounting the same in a frame, such as that of a motor vehicle, for the purpose of eliminating the transmission of vibrations to the frame, as well as to an arrangement for eliminating to a large extent vibration which would otherwise be produced within the transmission itself.

There are many examples of continuously variable power transmissions which operate by transferring energy from a motor to a driven element in a series of rapid intermittent energy impulses at varying ratios of torque between the motor and the driven member. All such transmissions heretofore produced are known to be more or less "rough" in their operation inasmuch as the intermittent impulses produced upon the driven member set up corresponding reactions in the stationary portions of the transmission which lead to exceedingly annoying vibrations, especially when such transmissions are used in motor vehicles. The present invention provides a manner of reducing the amount of vibration produced by these intermittent torque reactions and preferably may be said to embrace the dividing up of the output torque between two driven members, for example, two traction wheels of a vehicle, and the staggering of the torque impulses delivered to one driven member between those delivered to the other. The transmission of any remaining vibrations which may be produced from the transmission to the frame is further eliminated by mounting the transmission in such a manner that it may freely oscillate about an axis parallel to the axis about which the impulses of torque reaction are produced, and, in order to reduce the amplitude of oscillation of the transmission about this axis, means may be provided for increasing the moment of inertia of the transmission, for example, by the mounting of the motor adjacent to the transmission and on the opposite side of the axis of oscillation thereof. The invention also aims to provide a novel combined motor and transmission unit in which simple and reliable mechanism is provided for transmitting power from the motor to the transmission without the use of gearing.

Other objects include the provision of a novel motion converting mechanism for converting rotary motion about one axis into non-synchronous oscillatory motion of two independent members about a common axis at right angles to the first mentioned axis and to provide generally a more satisfactory, reliable and economical construction for delivering power to a driven member at varying torques without the production of annoying vibrations.

Further objects and advantages of the present invention will be apparent from the following description, reference being had to the accompanying drawings wherein Fig. 1 is a top view of a portion of a motor vehicle chassis embodying the preferred form of the invention;

Fig. 2 is a sectional view taken on the line 2—2 of Fig. 1;

Fig. 3 is a sectional view taken on the line 3—3 of Fig. 2;

Fig. 4 is a sectional view taken on the line 4—4 of Fig. 1;

Fig. 5 is a perspective view of a crank forming a portion of the present mechanism;

Fig. 6 is a diagrammatic perspective view of a preferred layout of cranks and connecting rods;

Fig. 7 is a diagrammatic perspective view of a modified layout of cranks and connecting rods;

Fig. 8 is a diagrammatic perspective view of another modified layout of cranks and connecting rods;

Fig. 9 is a top view partly in cross section of a modification of the invention;

Fig. 10 is a cross section taken on line 10—10 of Fig. 9;

Fig. 11 is a cross section taken on line 11—11 of Fig. 9;

Fig. 12 is a view corresponding to Fig. 11 with the parts in another position;

Fig. 13 is a top view partly in cross section of a further modification of the present invention; and Fig. 14 is a top view partly in cross section of a portion of a motor vehicle embodying the structure illustrated in Figs. 9–12, inclusive.

Referring now to Fig. 1, there is illustrated a motor vehicle having a chassis frame 2 of any suitable construction, which is supported by means of a suitable spring suspension 4 upon a pair of traction wheels 6. A combined motor and transmission unit, generally designated as 10, and comprising a motor portion 12 and a transmission portion 14, is pivotally mounted upon the frame 2 by means of a pair of resilient mountings 16, preferably of the type including an element of rubber to give the mounting resilience. The unit is mounted in the frame in such a position that the transmission portion 14 is located intermediate the wheels 6 and preferably approximately on their axis of rotation, although it may be located somewhat above or below this axis, as may be necessitated by considerations of ground clearance and other factors in the design of a particular vehicle. The location of the resilient mountings 16 is such that they will permit oscillation of the unit as a whole about an axis through the center of gravity of the unit and preferably parallel to the axis of the wheels 6. A pair of flexible shafts 18 are connected to join the driven parts of the transmission with each wheel 6 and may preferably be formed of rubber, although other forms of flexible shafting may be used, such as a section of rigid shafting joined by a universal joint at either end to the transmission and to the wheel and including a splined section.

Referring now to Figs. 2 and 3, there is shown the internal mechanism of the motor transmission unit, certain necessary portions of the motor which form no part of the present invention being omitted for the sake of clearness. The crank shaft of the motor is indicated at 20 and, for a four-cylinder motor such as that illustrated, may include a relatively long central crank pin 22, which connects at either end with a pair of fly wheels 24. On the opposite sides of the fly wheels 24 there is formed a journal for the main bearings 26, beyond which there is formed conventional crank throws 28 for the two end cylinders and ending at either end in a pair of main bearings 30. Connecting rods 32 of any suitable type connect the crank shaft 20 to the pistons of the motor. The main frame of the unit may include a motor block casting 34 extending as far down as the horizontal plane of the crank shaft and carrying the main bearings in the usual manner, and includes a lateral extension 36 which forms a portion of the housing and support for the transmission mechanism. Journaled in bearings 38 in the extension 36 are a pair of shafts 40 connected at one end of each with the flexible shafts 18 and connected at their other ends inside the housing 36 with a combination inertia member and driven part of a one-way clutch 42, the internal construction of the one-way clutch forming no part of the present invention and being of any desired type, numerous examples of which are well known, and further description of which is unnecessary. The driving portion of the one-way clutches includes a pair of shafts 44 rigidly connected to a pair of cranks 46, 48, crank 46 extending upwardly while the crank 48 extends downwardly from the shafts 44. Connecting rods 50, 52, connect between the crank pin 22 and the cranks 46 and 48, respectively. A central reinforcing rib 54 is formed in the main housing member 34 and extends downwardly into the lateral extension 36 to support the bearing 56 for the adjacent inner ends of the shafts 44 (see Fig. 4). Counterbalances 59 may be provided for counterbalancing each of the crank members in the mechanism in the well known manner. A bottom and side cover member 58 is bolted to the casting 34 to form a closure for the motor transmission unit, within which a body of oil may be kept and pumped to the various bearing surfaces in a manner well known in the art for lubrication.

Referring to Fig. 6, it will be seen that as the pistons are reciprocated vertically in their cylinders in the well known manner, rotation of the crank shaft 20 in the direction of the arrow will result. The connecting rods 50 and 52 will produce oscillation of the cranks 46 and 48 in the direction of the arrows indicated thereon, due to the fact that the crank 46 extends generally in the opposite direction of the crank 48, and inasmuch as the throw of the cranks 46 and 48 is greater than the throw of the crank pin 22 the crank shaft 20 may rotate unidirectionally and still maintain the angular motion of the cranks 46 and 48 materially under 180°. Considering the one-way clutches 42 to be constructed or, if manually controllable, adjusted so that they will engage only on rotation of the drive shafts 44 in the direction of forward rotation of the wheels 6 (counterclockwise in Fig. 2), it will be seen that during approximately one-half a revolution of the crank shaft 20 the crank 46 will be pulled forward by the connecting rod 50 and during approximately the other half revolution of the crank shaft 20 the crank 48 will be pushed in a forward direction by the connecting rod 52. It will thus be seen that energy is delivered alternately to each driven element 42a of the one-way clutches and that while crank 46 is delivering energy to its driven element 42a the crank 48 is returning in the opposite direction of rotation and, due to the one-way action of the clutch 42, is not delivering energy thereto except as noted later. The same is true of the crank 46 while the crank 48 delivers energy to its one-way clutch. Since in the illustrated construction the flexible shafts 18 are formed of rubber or other torsionally resilient material, the driven elements 42a of the one-way clutches are of such inertia in respect to the force displacement characteristics of the shaft 18 that energy is delivered to the wheels 6 at automatically and continuously variable ratios between the torque delivered to the wheels and the torque applied by the crank shaft 20. Considering the operation of the energy delivering mechanism for one wheel only, the operation of the other being substantially the same, it will be seen that with any given torque requirement at the wheel and with the motor idling, oscillation of the shaft 44 will on its forward stroke move the driven member 42a of the one-way clutch with it throughout the full stroke and torsionally stress the shaft 18, but not sufficiently to move the wheel 6. On the back stroke of the shaft 44 the stress of the shaft 18 will urge the driven member 42a back with the shaft 44 since the oscillation is relatively slow at idling speeds of the motor and thus as long as the motor speed is not increased the driven member 42a will follow exactly the oscillations of the shaft 44. However, when the motor speed is increased the torsional stress of the shaft 18 when the shaft 44 and driven element 42a are at the end of their forward stroke will not be sufficient to move the driven element 42a back as rapidly as shaft 44 is moved back by the connecting rod 50 and so on the beginning of the next forward stroke the one-way clutch will engage the driven element 42a before it has returned to starting position. Consequently, at the end of the next forward stroke the driven element 42a will have been rotated forward further than it was rotated forward on the previous stroke and the shaft 18 will be torsionally stressed to a correspondingly greater extent. As long as the torsional stress of the shaft 18 is insufficient to overcome the torque requirements at the wheel 6, the last mentioned phase of operation will continue until the stress of the shaft 18 is sufficient to move the driven element 42a back at the same speed that connecting rod 50 moves the shaft 44 back. As the motor speed is further increased, the shaft 44 again moves back faster than shaft 18 can move the driven element 42a back and the shaft 18 is thus further stressed in the manner described immediately above. As the motor speed is thus increased, a point will be reached at which the torsional stress on shaft 18 will become great enough to overcome the torque requirements at the wheel 6 and cause the wheel to revolve. As the wheel then revolves, the shaft 18 will be unstressed to some degree from the wheel end, but as long as the motor speed is maintained above that required to overcome the torque requirements of the wheel, power will continue to be delivered in intermittent impulses of torque applied to the shaft 18 by the shaft 44 acting through the driven element of the one-way clutch 42.

Considering the power delivery mechanism for both wheels now, it will be seen that energy impulses are delivered to the power delivery mechanism for each wheel alternately. Noting that the flexible shafts 18 are capable of transmitting to the transmission mechanism only torsional force about the axis of the shafts 44 and that the shafts 18 and the resilient mountings 16 are the only points at which external forces can be applied to the motor transmission unit as a whole, it is apparent that, neglecting inertia forces which may be substantially canceled by effective counterbalancing as illustrated, the only external forces are the alternate reactive couples produced on the casing of the unit by the impulses applied to the shafts 18. It is well known that a free body when acted upon by a purely torsional force will partake only of rotary motion about its center of gravity. It is also known that when the couple acting on such a free body is alternately reversed in direction the body will partake of an oscillation, the amplitude of which will remain constant, depending on the moment of inertia of the free body in relation to the magnitude of the couple.

Considering now the motor transmission unit as a whole it will be seen that since it is mounted for substantially unrestrained oscillation about an axis through its center of gravity parallel to the axis of the shafts 18 the alternately reversing couples of reactive torque will produce a resultant oscillation of the unit as a whole about the axis of the mountings 16. It will be noted that during the period before wheels 6 start to move and immediately thereafter when vibration in the usual impulse type of continuously variable power transmission is the worst, due to reverse reactive torque impulses being set up between the periods of forward reactive torque impulses and substantially equal thereto, vibration in the present device will be substantially eliminated. This is due to the fact that while one shaft 18 is receiving a forward torque impulse and delivering an equal reactive torque impulse to the unit as a whole the opposite shaft 18 will be delivering back to the transmission an equal torque impulse and setting up an equal reactive torque impulse on the transmission as a whole, but in the opposite direction. This action produces a transmission which is inherently freer from reactive vibration than other impulse type transmissions wherein power is delivered either to a single output member or to a plurality of output members in simultaneous impulses. Furthermore, under conditions where the staggered reactive impulses do not quite cancel each other the transmission of the resultant vibration to the vehicle or other frame to which the unit is mounted is completely prevented, due to the resilient mountings 16 which permit the vibration to be absorbed in the oscillation of the unit as a whole about an axis through its center of gravity.

In Fig. 7 there is illustrated a slightly modified construction of the crank shaft which approximates the form widely used in four-cylinder engines having three main bearings and in which the two center crank pins are utilized for operating the connecting rods 50 and 52 as well as for the usual piston connecting rods.

Fig. 8 shows a further modified form in which it may be desirable to have both cranks 46 and 48 extend generally in the same direction away from the shafts 44. In this construction staggering of the impulses delivered from the transmission is accomplished by providing additional crank throw 60 spaced 180° from the two center crank throws and operating one connecting rod 52, while the other connecting rod 50 is operated from one of the middle throws of the crank shaft, which also carries a piston connecting rod. Obviously, many other arrangements may be provided and engines of a less or greater number of cylinders may be used.

In Figs. 9-12, inclusive, there is illustrated a portion of a transmission utilizing mechanism for delivering power to the one-way clutches in staggered impulses and which is operated from a driving shaft, which may be the engine crank shaft, at right angles to the axis of the one-way clutch shaft. This may comprise a housing 64 having journaled therein at opposite sides a pair of one-way clutches 66 connected outside the housing to flexible shafts 68 in a manner analogous to that previously described. Journaled in the housing 64 about an axis at right angles thereto is a shaft 70 having formed thereon inside the housing 64 a series of journals 72 and 74 inclined at an angle to the axis of shaft 70. The journals 72 are inclined at an equal angle to the journals 74, but are preferably angularly spaced about the axis of the shaft 70 by one-half a revolution. The journals 72 are also farther spaced from each other than the journals 74. Each one-way clutch 66 has a drive shaft 76, 78, having a bifurcated end. Each end carries a pair of journals 80, 82. which are at right angles to the axis of the shafts 76, 78. and lie in a common plane with the axis of the shaft 70. The journals 80 are farther spaced from the axis of shaft 78 than the journals 82 are spaced from the axis of shaft 76. A small inner split circular yoke 84, having four bearings 90° apart thereon, joins the journals 74 to the journals 82, while a larger split circular yoke 86, having four corresponding bearings, joins the journals 80 with the journals 72.

Referring now to Figs. 11 and 12, it will be seen that rotation of the shaft 70 in the direction of the arrow A will cause the yoke 86 to move in the general direction of the arrow B. rotating with it the journals 80 and the shaft 78. and that the yoke 84 will move in the direction of the arrow C, rotating with it the journals 82 and the shaft 76. During this movement the yokes 84 and 86 will partake of rotation also about the journals 82 and 80, respectively. At the completion of one-half a revolution the parts will lie in the position shown in Fig. 12. During the next half revolution the motion of the shafts 76 and 78 will be reversed, bringing them back to their starting positions. It will thus be seen that constant rotation of the shaft 70 will produce oscillation of shafts 76 and 78, the velocity of shaft 76 being always equal to and opposite to that of the shaft 78, and vice versa.

While the parts have been illustrated more or less diagrammatically in order to make their operation more readily understood, it will be seen that the mechanism described may be utilized in a power transmission of the type described where it is desired to locate the driving shaft at right angles to the axis of the output shafts. For example, the mechanism of Figs. 9-12, inclusive, may be located intermediate the traction wheels of a vehicle while the motor of the vehicle may be located with its output shaft at right angles to the wheel axis and either at a distance from the housing 64 and connected thereto by the usual propeller shaft, or the motor may be located directly adjacent to the housing 64. Such a structure is illustrated in Fig. 14, wherein the motor is designated generally as 88, with the housing 64 and its enclosed mechanism located intermediate the ends of the motor. With the motor thus disposed equally on both sides of the axis of the wheels, resilient mountings 90 may be provided for permitting the entire unit to oscillate about its center of gravity, which in this instance is substantially coincident with the axis of the wheels. Obviously, the mechanism contained in the housing 64 could likewise be used with a motor mounted adjacent thereto, but located wholly on one side of the housing 64, suitable mounting means being provided for permitting oscillation of the unit as a whole about its center of gravity, which would then be spaced from the wheel axis.

In Fig. 13 there is illustrated a further modification of the invention showing an alternative construction for providing staggered impulses to the power delivering mechanisms operated from a driving shaft at right angles thereto. In this modification the driving shaft 92 is journaled in a housing 94 and carries on its end a beveled gear 96. A two-throw crank shaft 98 is also journaled in the housing 94 and is driven from the shaft 92 by a beveled gear 100 meshing with the beveled gear 96. One-way clutches 102 are journaled in the housing 94 analogously to the construction shown in Fig. 1 and have corresponding cranks 104 operated from the crank shaft 98 by connecting rods 106. The unit described may be mounted on pintles 108 for oscillation about its center of gravity, the transmission of forces other than couples thereto by the shaft 92 being substantially prevented by a universal joint 110. Operation of this structure is substantially the same as that illustrated in Fig. 1 except that the crank shaft 98 is driven through the beveled gears 96, 100, by the drive shaft 92 rather than being driven directly by the pistons of the motor, as in Fig. 1.

It will thus be seen that there has been provided a combined motor and transmission unit suitable for motor vehicle use in which the transmission of annoying vibrations to the occupants of a motor vehicle is eliminated, first, by materially reducing the amount of vibration produced in the transmission and, second, by mounting the transmission in a frame in such a manner as to avoid transmission thereto of any vibration. Furthermore, the invention provides simple, reliable and economical means for transmitting power from the motor to a continuously variable power transmission of the impulse type and for staggering the power impulses delivered between a pair of driven members.

I claim:

1. In a motor vehicle, a pair of traction wheels, a main frame supported by said wheels, a torsionally-flexible rotary drive-shaft for each of said wheels, power means for variably imparting rapid, intermittent torque impulses alternately to one and the other of said torsionally-flexible drive-shafts, a casing for said power means, said drive-shafts being journaled on said casing for rotation on a common axis, and means for oscillably mounting said casing upon said main frame, said mounting means being disposed upon an axis of oscillatory movement parallel to the axis of rotation of said torsionally-flexible drive shafts and passing through the center of gravity of said casing and its supported power-imparting means.

2. In a motor vehicle, a pair of traction wheels, a main frame supported by said wheels, a torsionally-flexible rotary drive-shaft for each of said wheels, power means for variably imparting rapid, intermittent torque impulses alternately to one and the other of said torsionally-flexible drive-shafts, a casing for said power means, said drive shafts being journaled on said casing for rotation on a common axis, and means for oscillably and resiliently mounting said casing upon said main frame, said mounting means being formed of resilient material disposed upon an axis of oscillatory movement parallel to the axis of rotation of said torsionally-flexible drive shafts and passing through the center of gravity of said casing and its supported power-imparting means.

3. In a motor vehicle, a pair of traction wheels, a main frame supported by said wheels, a torsionally flexible rotary drive-shaft for each of said wheels, said drive-shafts being journaled for rotation upon a common axis, power means for variably imparting rapid, intermittent torque impulses alternately to one and the other of said torsionally flexible drive-shafts, said power-imparting means including a rotary prime-mover, the axis of rotation of which is parallel to and spaced from the rotary axis of said drive-shafts, and driving connections between said prime-mover and said drive-shafts, a common base on which said rotary prime-mover and drive-shafts are journaled, and means for oscillably mounting said base upon said main frame, said mounting means being disposed upon an axis of oscillatory movement parallel to, and intermediate, said prime-mover and drive-shaft axes and passing through the center of gravity of said base and its supported power-imparting means.

CHARLES J. ANDERSON, Jr.